US005524189A

United States Patent [19]
Hayama

[11] Patent Number: 5,524,189
[45] Date of Patent: Jun. 4, 1996

[54] IMAGE SIGNAL GENERATING SYSTEM

[75] Inventor: Yuuya Hayama, Tokyo, Japan

[73] Assignee: NEC Corporation, Tokyo, Japan

[21] Appl. No.: 154,132

[22] Filed: Nov. 18, 1993

[30] Foreign Application Priority Data

Nov. 18, 1992 [JP] Japan .................................. 4-308383

[51] Int. Cl.$^6$ ...................................................... G06F 15/62
[52] U.S. Cl. ............................................................ 395/141
[58] Field of Search ...................................... 395/133, 141, 395/150, 140, 142, 143; 345/118, 132

[56] References Cited

U.S. PATENT DOCUMENTS 5,371,840  12/1994  Fischer et al. ............................ 395/133

Primary Examiner—Phu K. Nguyen
Attorney, Agent, or Firm—Foley & Lardner

[57]  ABSTRACT

An image signal generating system has a contour drafting control portion. The portion generates contour points of a predetermined character on the basis of character information. It also writes contour information of the generated contour points in corresponding storage portions of a work memory per a drafting effective region. Further, the portion updates a value stored in the storage portion of a counter table at a corresponding position in the Y-direction to the contour point when a contour point to be present in another drafting effective region is positioned at a raster scanning starting side in the X-direction with respect to the drafting effective region currently processed. There is also a painting processing portion for scanning the work memory per one line in the X-direction, and updating a value of the storage portion of the counter table corresponding to the scanning line and generating painting data for the area where the value of the counter table is other than "0".

9 Claims, 11 Drawing Sheets

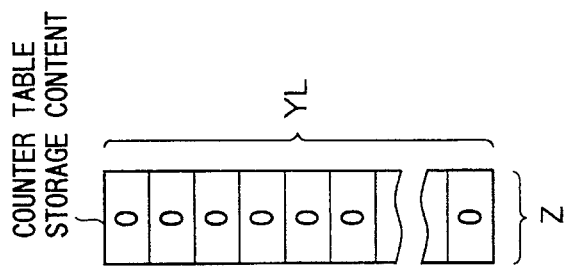
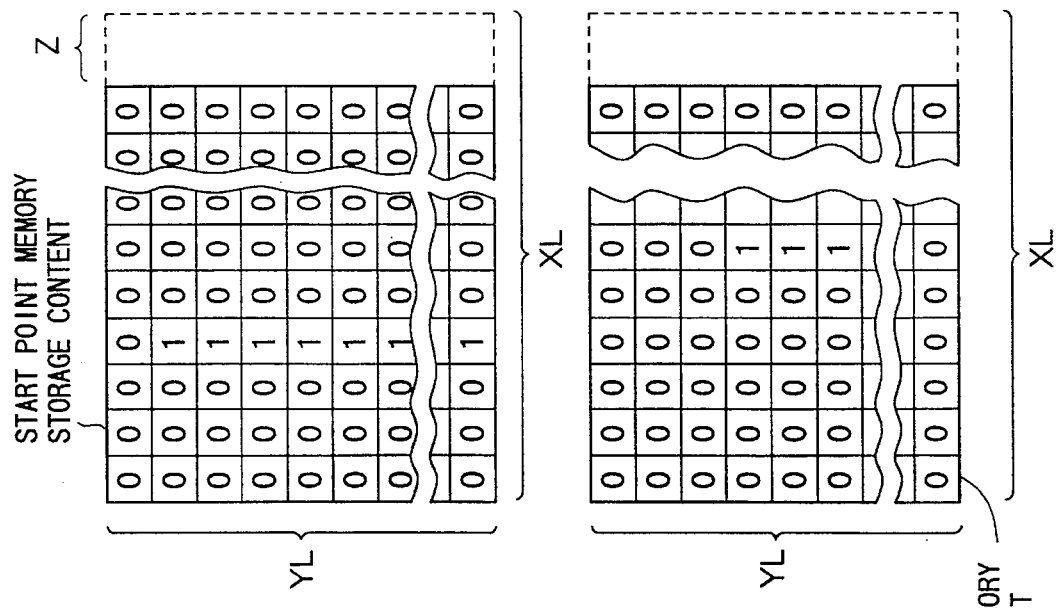
FIG.3B
FIG.3C

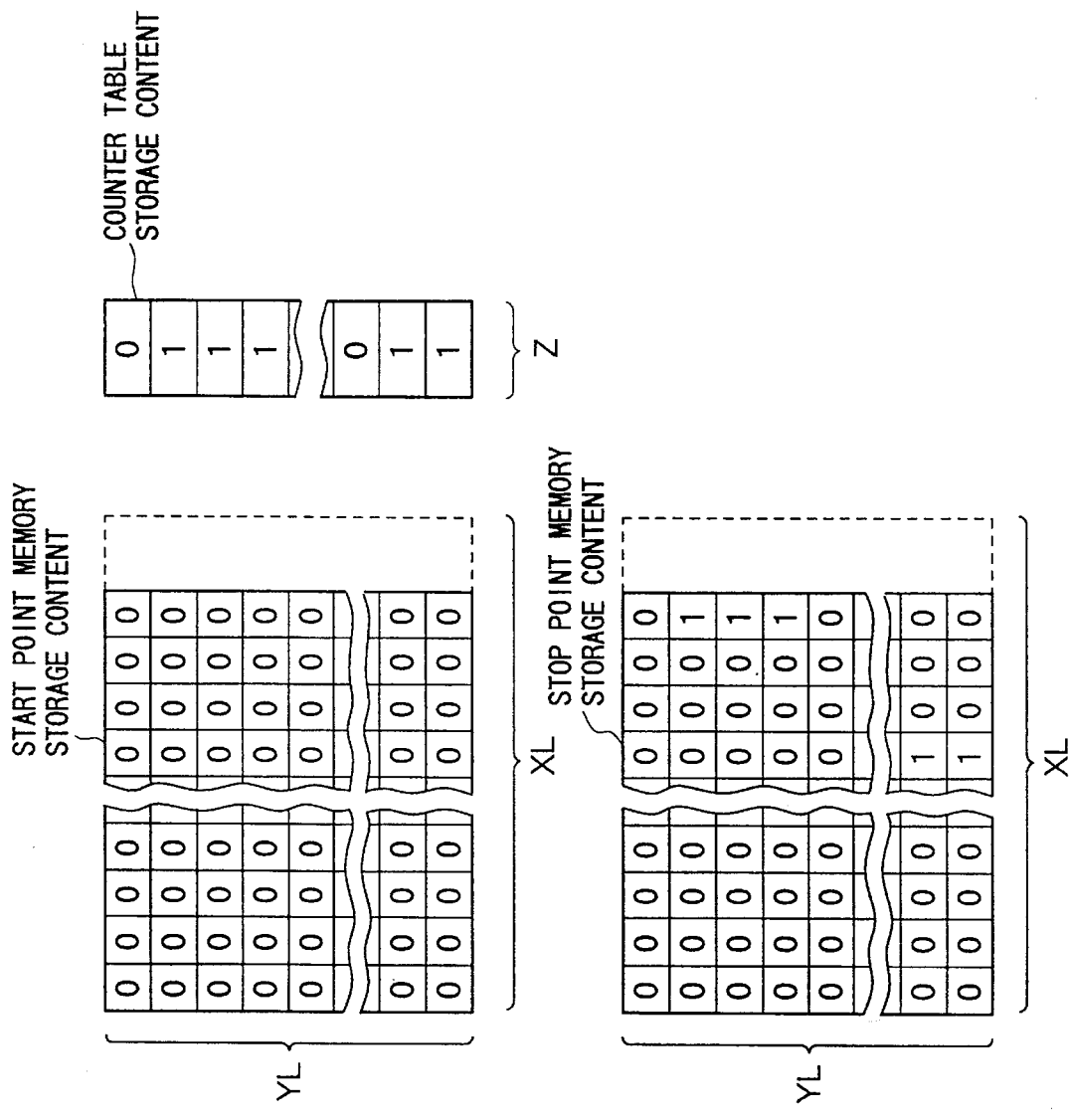

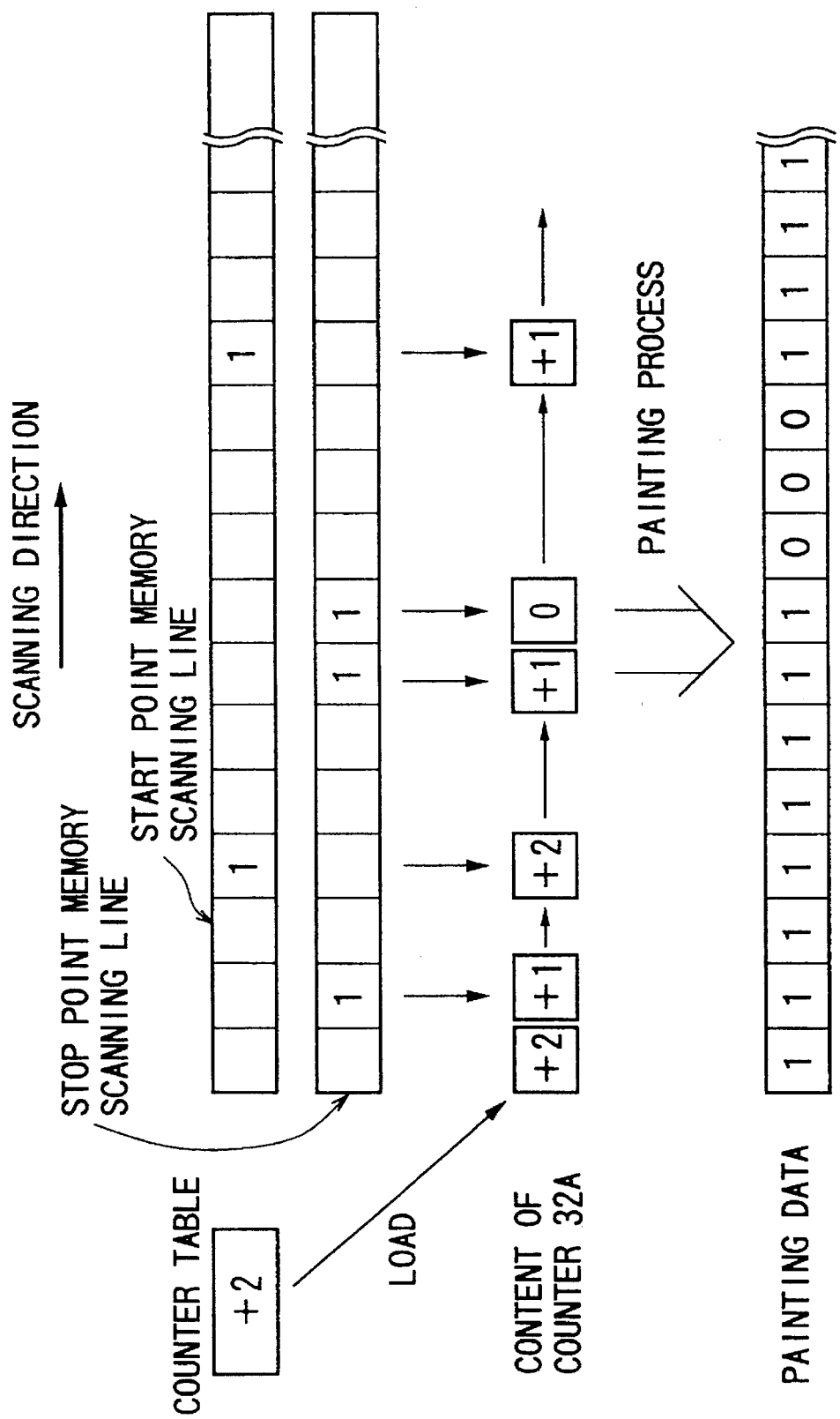

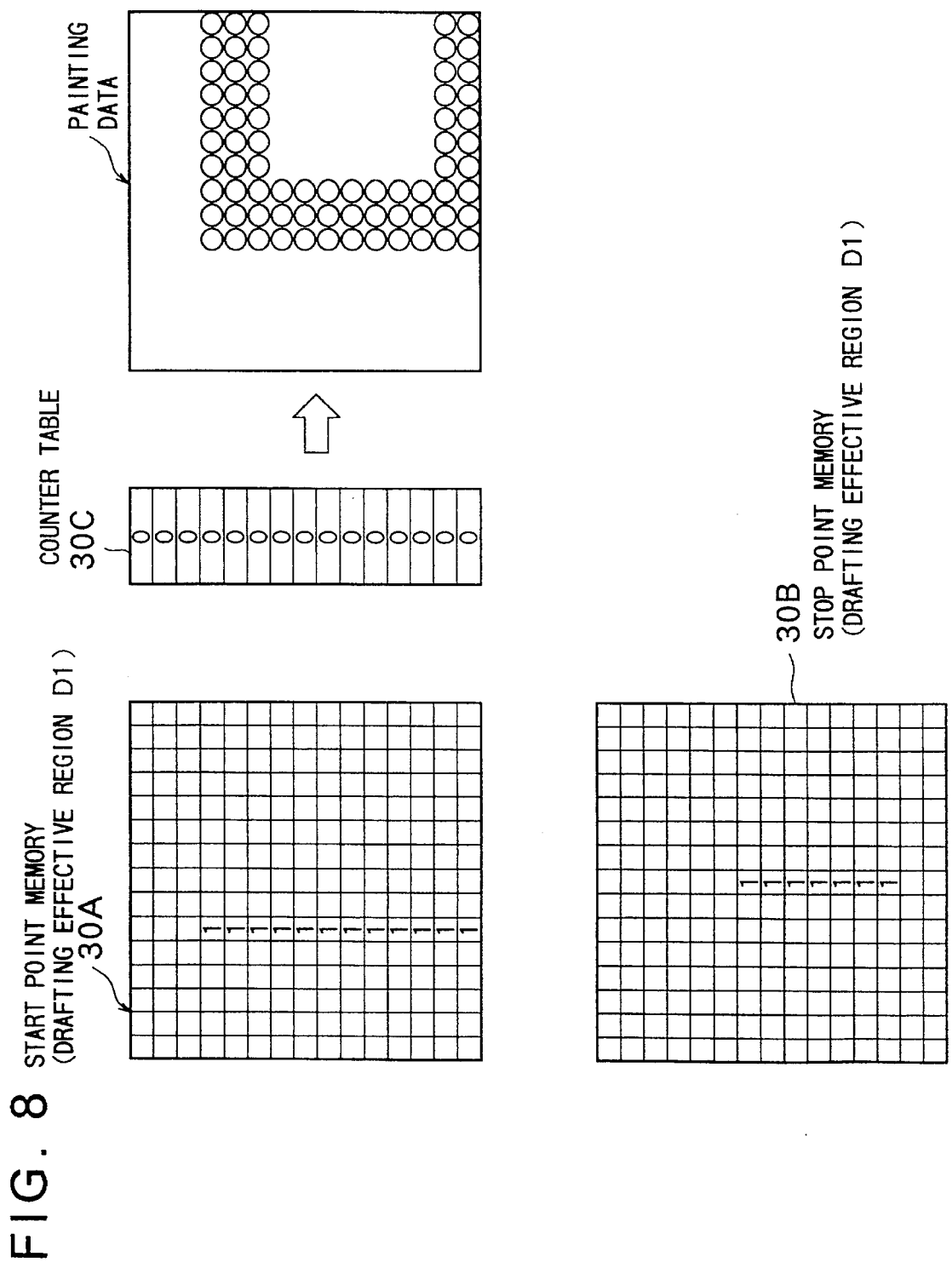

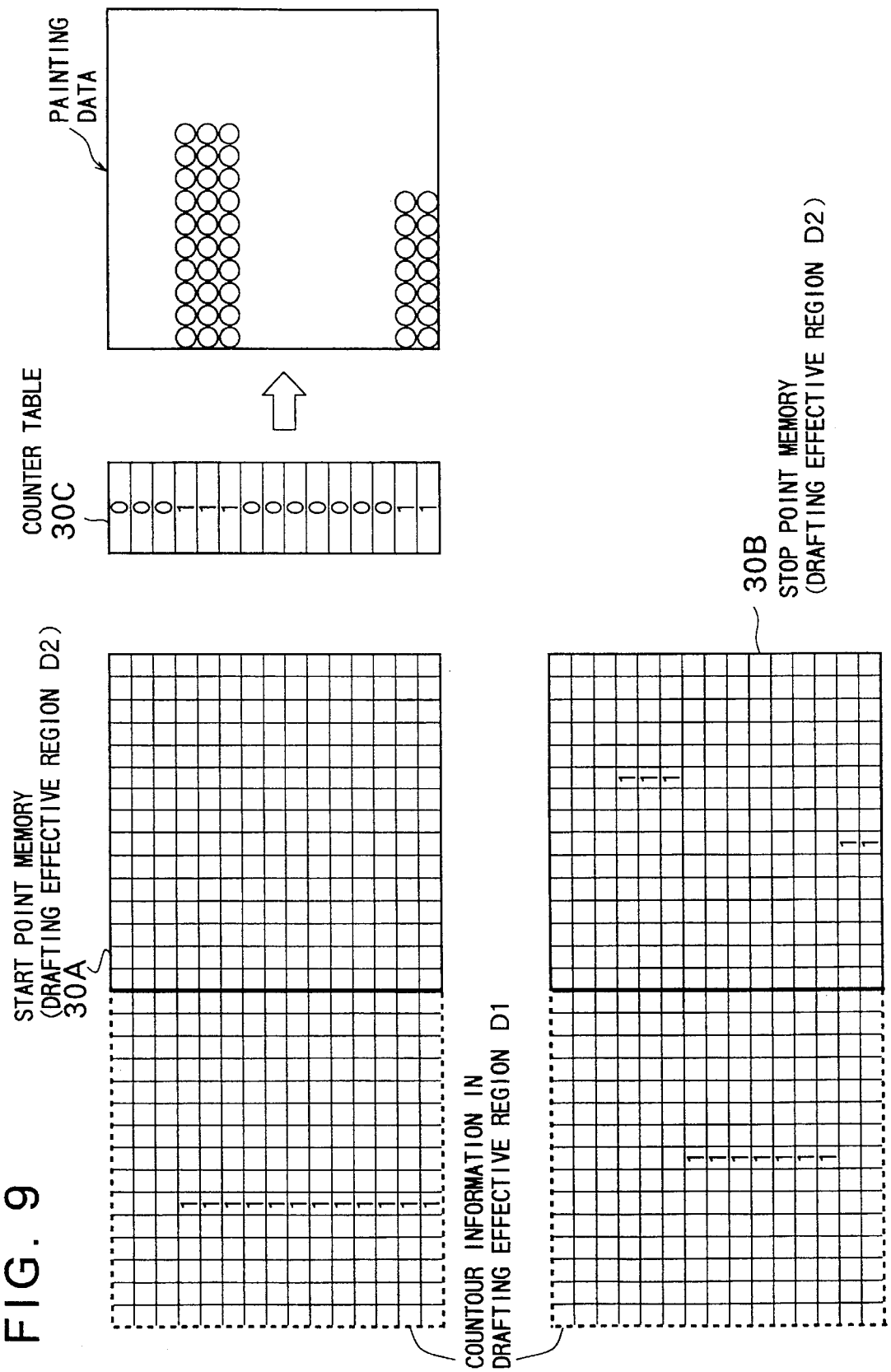

IMAGE SIGNAL GENERATING SYSTEM

BACKGROUND OF THE INVENTION

1. Field of the Invention

The present invention relates generally to an image signal generating system. More particularly, the invention relates to a stroke-dot type image signal generating system for generating an electronic image signal for a character, sign or so forth for displaying on a display screen or for printing by a printer or so forth, of the character, sign or so forth processed by an information processing system, such as a computer or so forth.

2. Description of the Related Art

As systems for generating image signal for character, sign or so forth processed by an information processing system, such as a computer or so forth, dot system, stroke system and stroke-dot system have been conventionally known.

The dot system is also called as full-dot system and, in which a character pattern as an aggregate of dots is preliminarily prepared and stored. When a desired character is to be displayed or printed, the character pattern corresponding to the desired character is read out from a storage portion and output. In this dot system, the character patterns are required for difference sizes of the same character to require large capacity for storing the character patterns. The stroke system generates the character pattern, in which the contour of the character is approximated by straight lines.

The stroke-dot system generates the character pattern by generating the contour of the character based on a stroke information (contour information) and painting the inside of the contour by dots. This stroke-dot system permits generation of arbitrary sizes of character patterns by expansion and compression by storing stroke information of a predetermined size of character. Since this system requires storing only stroke information for the specific or predetermined size of character, the required storage capacity can be much smaller than that of the dot system.

The conventional image signal generating system employing this stroke-dot system drafts the contour of the desired character on a work memory on the basis of the stroke information of the corresponding character, and paints inside of the contour by raster scanning of the work memory on which contour drafting is performed to generate the painted data.

When a character pattern greater than the capacity of the work memory is to be generated, the character is divided into a plurality of drafting regions in a Y-axis direction so that contour is drafted for each drafting region, and then the inside of the contour is painted to produce the painted data. Thus, it becomes possible to generate the character pattern expanded in the Y-axis direction. However, the size of the drafting region in X-axis direction is limited within the physical size in the X-axis direction of the work memory so that a large capacity of the work memory is required for obtaining the character expanded in the X-axis direction. Namely, greater capacity of the work memory is required for greater size of the character to be generated. Accordingly, the system to generate the large character inevitably becomes expensive for the requirement of the greater capacity of the work memory.

SUMMARY OF THE INVENTION

It is an object of the present invention to eliminate the above-mentioned drawbacks in the prior art and to provide an image signal generating system which can generate an arbitrary size of character pattern without relying on the capacity of the work memory.

Another object of the present invention is to provide an image signal generating system which can realize generation of a large character pattern with a small capacity of work memory without requiring a large capacity of the work memory and whereby realize the image signal generating system at low cost.

In order to accomplish the above-mentioned objects, an image signal generating system, according to one aspect of the invention, comprises a work memory having storage portions arranged in a array of m in number in the X-direction and n in number in the Y-direction, for storing contour information of a predetermined character per pixel for generating a painting data. There is a counter table having n in number of storage portions corresponding to the Y direction of the work memory. Also, included is a contour drafting control means for inputting a stroke information indicative of a closed contour of the predetermined character and a drafting effective region indicative of each divided regions when the predetermined character is divided into a plurality of regions, generating contour points of the predetermined character on the basis of the character information, writing contour information of the generated contour points in the corresponding storage portions of the work memory per the drafting effective region, and, whenever a contour point to be present in another drafting effective region positioned at a raster scanning starting side in the X-direction with respect to the drafting effectively region currently processed, is present, updating a value stored in the storage portion of the counter table at corresponding position in the Y-direction to the contour point. Further provided is a painting means for scanning the work memory per one line in the X-direction, updating value of the storage portion of the counter table corresponding to the scanning line and generating the painting data for the area where the value of the counter table is other than "0".

In the preferred construction, the work memory includes a start point memory for writing contour points starting the painting process and a stop point memory for writing contour points terminating the painting process. The contour drafting means increments by "1" the value stored in the storage portion of the counter table corresponding in the Y-direction when the contour point presents in another drafting effective region positioned at the raster scanning starting side in the X-direction is the contour point to be written in the starting point memory and decrements by "1" the value stored in the storage portion of the counter table corresponding in Y-direction when the contour point presents in another drafting effective region positioned at the raster scanning starting side in the X-direction is the contour point to be written in the stop point memory. The painting means scans the start point memory and the stop point memory per one line in the X-direction, increments the value stored in the storage portion of the counter table by "1" whenever the contour information is present in the start point memory, decrements the value stored in the storage portion of the counter table by "1" whenever the contour information is present in the stop point memory, and generates the painting data for the region where the values of the counter table is other than "0".

In the further preferred construction, the painting means loads the values of the storage portion of the counter table corresponding to the line to be scanned whenever raster scanning for one line of the work memory is completed, and a counter for performing counting process for the loaded value.

In the still further preferred construction, the counter table is assigned to a part of the work memory.

Preferably, the image signal generating system further comprises counter table control means for updating the counter table in response to a command from the contour drafting control means and loading the values in the storage portion of the counter table corresponding to the line to be scanned.

Preferably, the counter table is assigned to a part of one of the start point memory and the stop point memory.

According to another aspect of the invention, an image signal generating system comprises a start point memory and a stop point memory each having storage portions arranged in a array of m in number in the X-direction and n in number in the Y-direction, for storing contour information of a predetermined character per pixel for generating a painting data.

There is also a counter table having n in number of storage portions corresponding to Y direction of the work memory. A contour drafting control means inputs a stroke information indicative of a closed contour of the predetermined character and a drafting effective region indicative of each divided regions when the predetermined character is divided into a plurality of regions, generates contour points of the predetermined character on the basis of the character information, writes contour information of the contour points for starting painting process in the corresponding storage portions of the start point memory and of the contour points for terminating painting process in the corresponding storage portions of the stop point memory per the drafting effective region, and, whenever a contour point to be present in another drafting effective region positioned at a raster scanning starting side in the X-direction with respect to the drafting effectively region currently processed, is present, up dates a value stored in the storage portion of the counter table at corresponding position in the Y-direction to the contour point. There is also a painting means for scanning the work memory per one line in the X-direction, updating value of the storage portion of the counter table corresponding to the scanning line and generating the painting data for the area where the value of the counter table is other than "0".

Preferably, the painting means loads the values of the storage portion of the counter table corresponding to the line to be scanned whenever raster scanning for one line of the start point memory and the stop point memory is completed, and a counter for performing counting process for the loaded value.

In the further preferred construction, the image signal generating system further comprises counter table control means for updating the counter table in response to a command from the contour drafting control means and loading the values in the storage portion of the counter table corresponding to the line to be scanned.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 3B is an illustration showing a content of a start point memory and a count table, for which a contour information is written with respect to the drafting effective region shown in FIG. 3A;

FIG. 3C is an illustration showing a content of a stop point memory, for which a contour information is written with respect to the drafting effective region shown in FIG. 3A;

FIG. 4B is an illustration showing a content of a start point memory and a count table, for which a contour information is written with respect to the drafting effective region shown in FIG. 4A;

FIG. 4C is an illustration showing a content of a stop point memory, for which a contour information is written with respect to the drafting effective region shown in FIG. 4A;

FIG. 7 is an illustration for discussion of an operation of the paint processing portion;

FIG. 8 is an illustration showing an example of a painting data on the basis of the contents of the start point memory and counter table of FIG. 3B and the stop point memory of FIG. 3C; and FIG. 9 is an illustration showing an example of a painting data on the basis of the contents of the start point memory and counter table of FIG. 4B and the stop point memory of FIG. 4C.

DESCRIPTION OF THE PREFERRED EMBODIMENT

Figure 1:
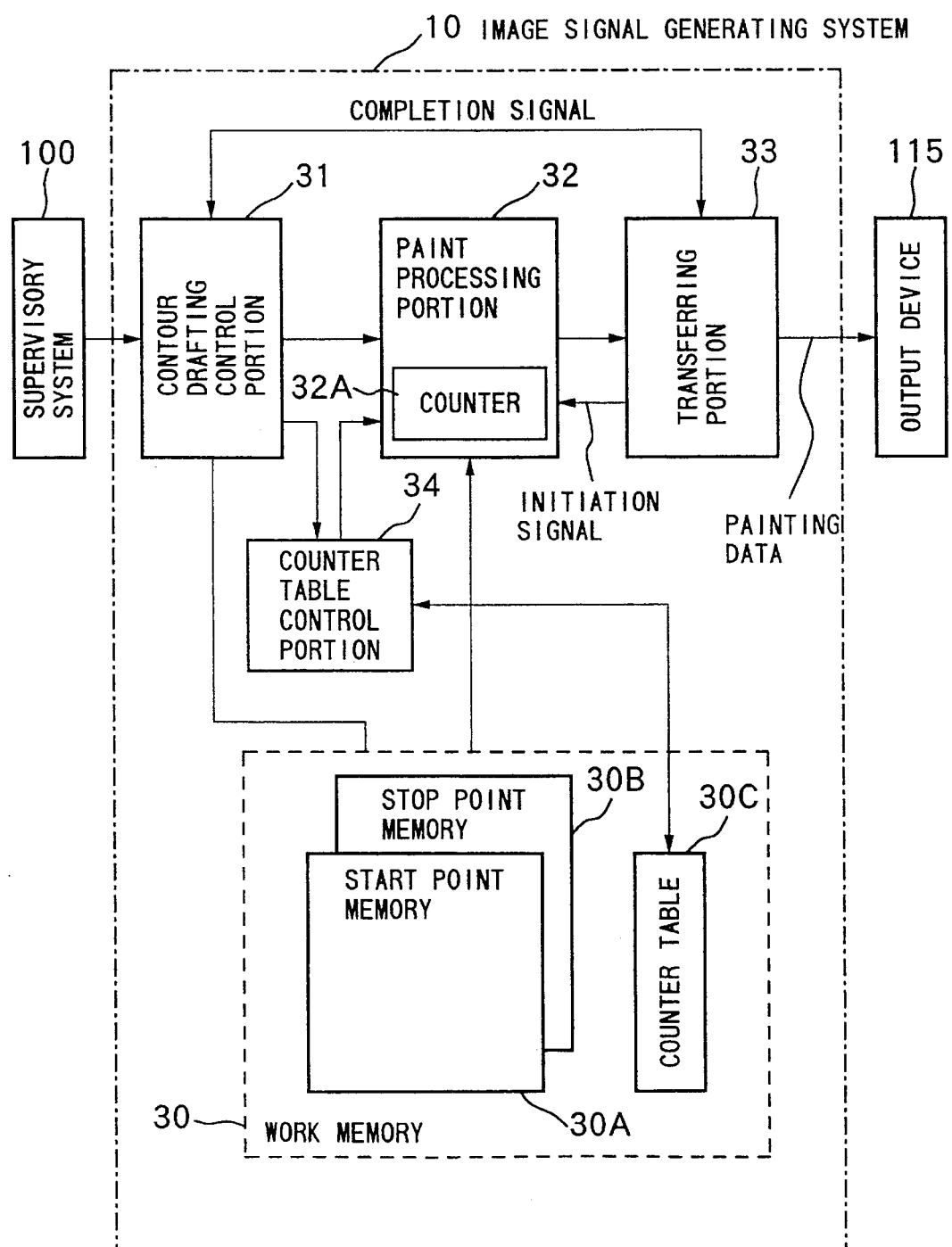
FIG. 1 is a block diagram showing a construction of the preferred embodiment of an image signal generating system according to the present invention.

The preferred embodiment of an image signal generating system according to the present invention will be discussed hereinafter with reference to the accompanying drawings. FIG. 1 is a block diagram of the preferred embodiment of the image signal generating system according to the present invention.

The shown embodiment of the image signal generating system 10 includes a work memory 30 which has a start point memory 30A, a stop point memory 30B and a counter table 30C. The system 10 also includes a contour drafting control portion 31 which performs drafting of contour information for the start point memory 30A and the stop point memory 30B on the basis of a stroke information and a drafting effective area for one character designated by an image signal output command output from a supervisory system 100. The contour drafting control portion 31 also performs a counting process for the counter table 30C as required. The system 10 further includes a paint processing portion 32 for performing painting process on the basis of the content of the start point memory 30A, the stop point memory 30B and the counter table 30C and generating a paint signal. The system includes a transferring portion 33 for outputting the paint signal to an external output device 115. Also, the system 10 includes a counter table control portion 34 for performing writing process and reading process of a counter value for the counter table 30C.

The supervisory system 100 provides the image signal output command including a stroke information relating to one character to be output to the output device 115 which is a display unit or a printer, and a drafting effective region information defining divided regions when an output region of the character is divided. The stroke information is information expressing a closed contour of one character by X–Y coordinates indicative of a start point of the contour and incremental values in X-axis and Y-axis directions from the start point at each contour portion. On the other hand, the drafting effective region information is information defining boundaries between divided regions when an output region (for example, a display region in case of a display unit) is divided into a plurality of regions in X-axis and Y-axis directions upon outputting one character to the output device 115.

The start point memory 30A and the stop point memory 30B of the work memory 30 have a plurality of storage unit portions which can store the contour information of the character per pixel (dot) as a minimum unit for outputting the character on the output device 115. The start point memory 30A and the stop point memory 30B are provided the same storage capacity. On the other hand, each storage unit portion of the start point memory 30A and the stop point memory 30B are arranged in the same arrangement to the pixel arrangement of the character to be output (displayed or printed) by the output device 115. The start point memory 30A and the stop point memory 30B have a corresponding number of storage unit portions to number of pixels for drafting whole or a part of the character region output by the output device 115.

Figure 2:
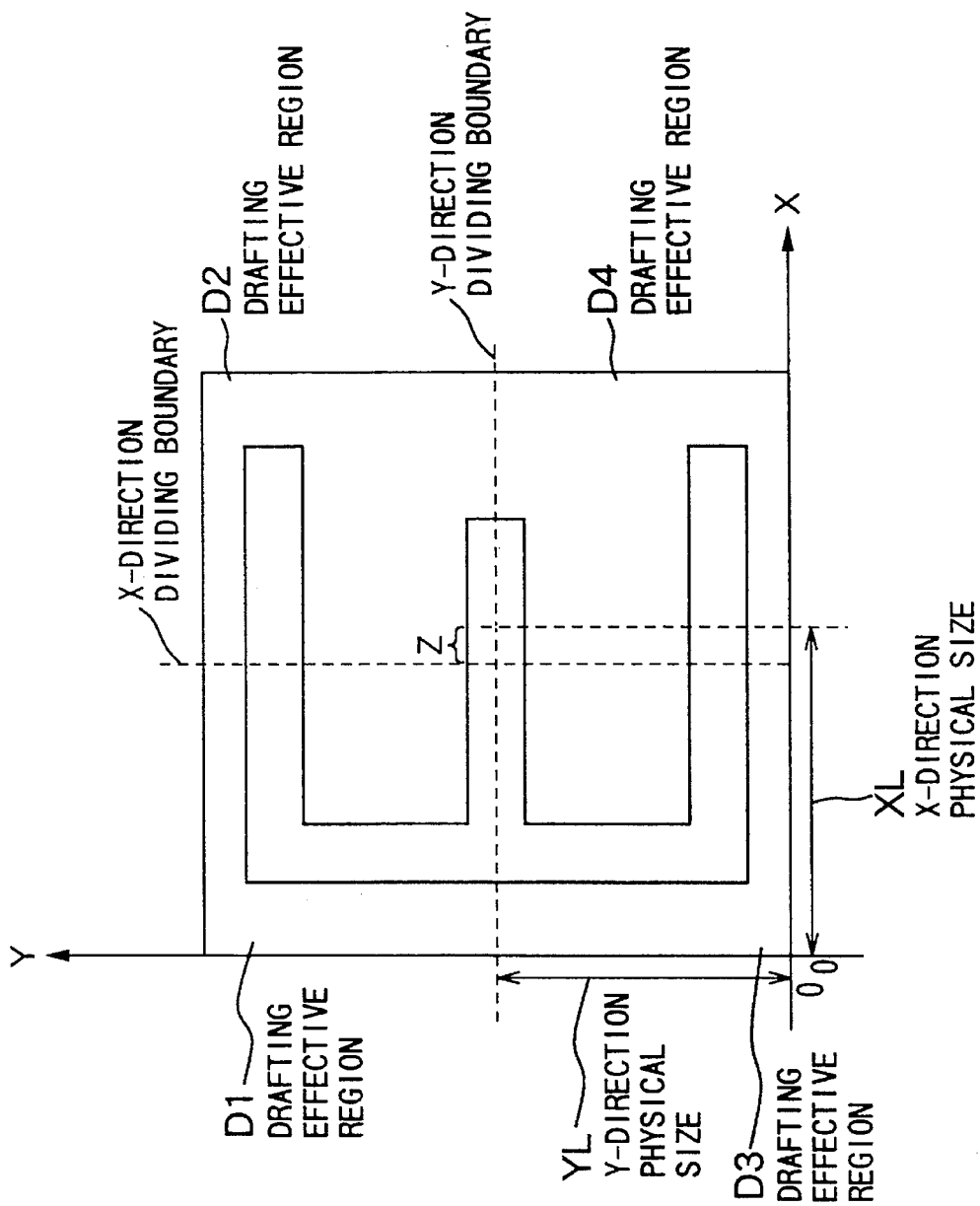
FIG. 2 is an illustration showing of an example of a character to be effected a painting process by the image signal generating system and a relationship between a drafting effective region and a physical size of a work memory.

Here, each of the start point memory 30A and the stop point memory 30B is constituted of an array of the storage unit portions in number of XL in the X-axis direction and in number of YL in the Y-axis direction. As shown in FIG. 2, the region on the output device 115 which can be expressed by XL of the storage unit portions, is identified as a physical size in the X direction, and the region on the output device 115 which can be expressed by YL of the storage unit portions, is identified as a physical size in the Y direction.

Reference is made to FIGS. 1 and 2. The counter table 30C is a table for storing a paint control information when painting process is performed by the paint processing portion 32. The counter table 30C has YL of storage unit portions corresponding to number of storage unit portions in Y direction in the start point memory 30A and the stop point memory 30B. The counter table 30C is assigned to a pair of either of the start point memory 30A and the stop point memory 30B. Namely, in one of the start point memory 30A and the stop point memory 30B, Z in number of storage unit portions (for pixels of Z in number) in the X direction and YL in number of the storage unit portions are assigned as the counter table 30C. By this construction, the YL in number of the storage unit portions of the counter table 30C can store information for Z bits. In the shown embodiment, the counter table 30C is constructed with Z=8. It should be noted that, in the illustrated embodiment, the counter table 30C is assigned to the start point memory 30A. As can be appreciated, by assigning the counter table 30C to the start point memory 30A or the stop point memory 30B, increasing of the memory capacity can be minimized. Of course, it is possible to provide a separate memory for the counter table 30C.

No problem will arise as long as the region of the character output by the output device 115 is smaller than or equal to the physical sizes in the X and Y directions of the start point memory 30A and the stop point memory 30B. However, when the region of the character is greater than the physical sizes in X and Y directions of the start point memory 30A and the stop point memory 30B, particularly when the size of the region of the character in the X direction is greater than the physical sizes in X direction of the start point memory 30A and the stop point memory 30B, it becomes not possible to accurately perform the paint process in the conventional method.

When the region of the character is greater than the physical sizes in X and Y directions of the start point memory 30A and the stop point memory 30B, the region of the character is divided into a plurality of drafting effective regions to perform the painting process for each drafting effective region in the following manner.

$$\text{Number of Division for } X \text{ direction} = \frac{X \text{ size of Character Region}}{X \text{ direction Physical size } XL - Z}$$

$$\text{Number of Division for } Y \text{ direction} = \frac{Y \text{ size of Character Region}}{Y \text{ direction Physical size } YL}$$

It should be rounded up for lower than the radix. Here, in dividing in the X direction, the size of Z for the counter table 30C is subtracted from the physical size XL in the X direction.

On the other hand, in the above-mentioned case, the drafting effective region has a size of (X direction physical size XL -Z) in the X direction and Y direction physical size YL in the Y direction. However, the size in the X direction may be arbitrarily variable as long as the size is smaller than or equal to (X direction physical size XL - Z).

The process for dividing the character region into a plurality of the drafting effective regions is performed by the supervisory system 100. Based on the results of dividing process, the supervisory system 100 outputs the stroke signal and the drafting effective region information of the character as set forth above.

The paint processing portion 32 has a code including 8 bit counter 32A. Also, the paint processing portion 32 generates a raster scan signal for scanning X direction lines in X direction (from left to right and from right to left) with respect to the start point memory 30A and the stop point memory 30B and shifting the scanning line in Y direction from up to down in order.

Hereinafter, discussion will be given for the case where the stroke information of the character "E" shown in FIG. 2, and the image signal output command designating four drafting effective regions D1–D4 are provided from the supervisory system 100, with reference to FIGS. 3A–3C, FIGS. 4A–4C and FIGS. 5–9.

At the initial condition, initial values "0" are stored in respective storage portions of the start point memory 30A, the stop point memory 30B and respective storage portions of the counter table 30C.

Figure 5:
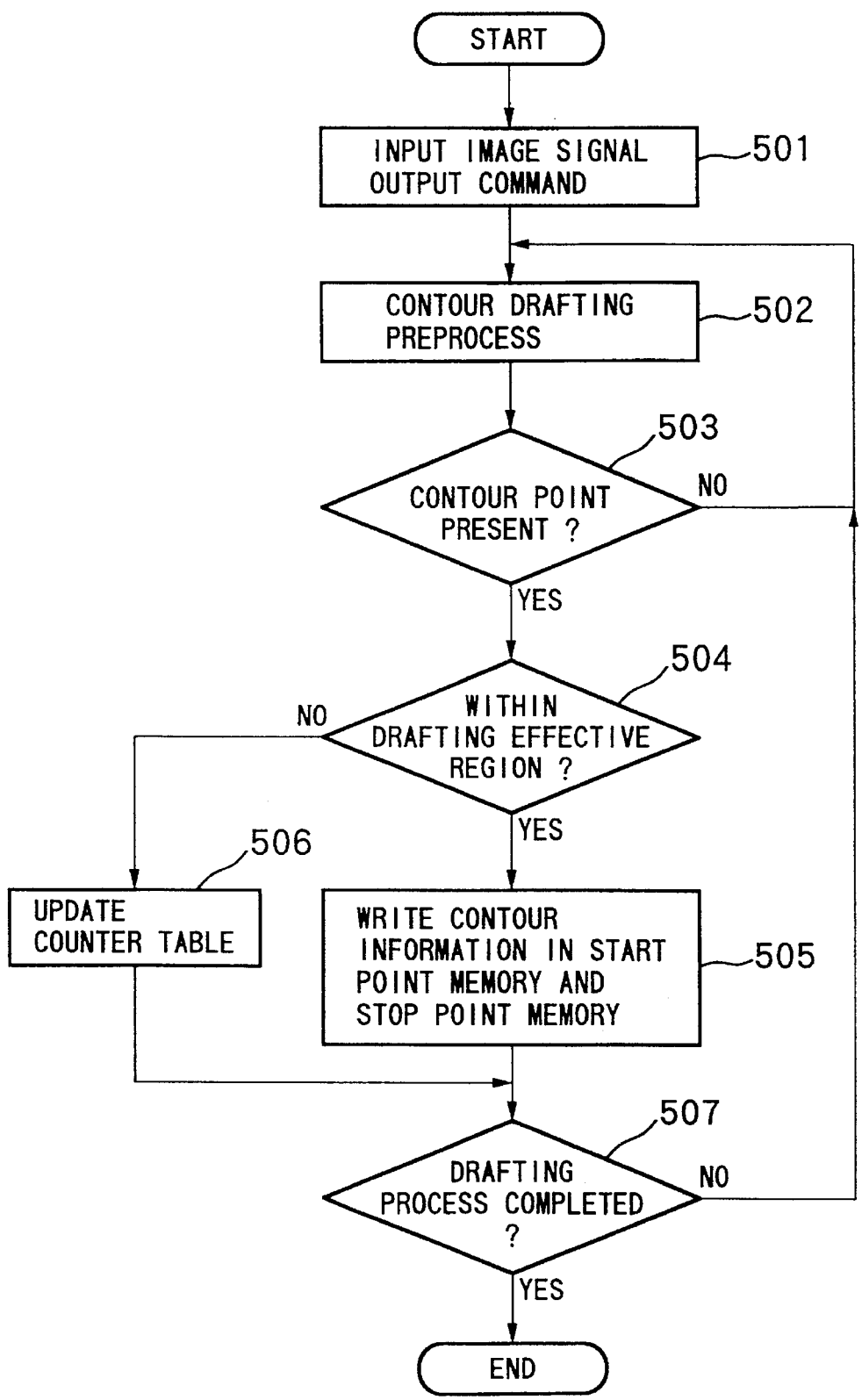
FIG. 5 is a flowchart for discussion of a process of a contour drafting control portion.

At first, the process of the contour drafting control portion 31 is shown through steps 501–507 of a flowchart in FIG. 5. When the image signal output command including the stroke signal and the drafting effective region is input from the supervisory system 100 (step 501), the contour drafting control portion 31 performs a drafting process for the contour of the character "E" per drafting effective regions D1–D4. Namely, the contour drafting control portion 31 generates contour points on the basis of the stroke information of the character. Then, the contour drafting control portion 31 performs a process for drafting the generated contour points on the start point memory 30A and the stop point memory 30B.

Namely, as the drafting process, the contour drafting control portion 31 generates and identifies the contour points on the basis of the stroke information of the character (steps 502 and 503). This generation of the contour points is performed according to the X–Y coordinates of a start point of the contour of the character contained in the stroke information and incremental values in the X- and Y-axes directions from the start points of respective contour portions.

Once the contour points are generated, judgement is made whether each contour point is present within an intended specific drafting effective region (step 504). If the contour point is positioned within the intended drafting effective region, the contour information is written in the storage unit portion at the corresponding position in the start point memory 30A or the stop point memory 30B (step 505). Here, by discriminating an attribute of the contour points, a decision is made whether the contour information is to be written in the start point memory 30A or the step point memory 30B. For instance, if the incremental value of the contour point is increased in the X and Y directions with respect to the contour start point, the contour information is written in the start point memory 30A, and on the other than, if the incremental value of the contour point is decreased in the X and Y directions with respect to the contour start point, the contour information is written in the stop point memory 30B. In either case, when the incremental value in the Y direction is "0", the contour point is ignored and not written in the memory.

Drafting of the contour points in the start point memory 30A or the stop point memory 30B is performed by writing "1" as the contour information in the storage unit portion at the corresponding position.

When the contour point is not positioned within the intended drafting effective region, and when judgement is made that the contour point is positioned in another drafting effective region positioned at the raster scanning starting side (when the raster scanning is performed from left to right, the left side of the intended drafting effective region) at the painting process, a notice is given to the counter table control portion 34. Then, the storage unit portion of the counter table 30C at the corresponding position in the Y direction is updated the content (step 506). Namely, the counter table 30C is updated only for the contour point which has a Y-coordinate within the intended drafting effective region and a X-coordinates smaller than the minimum value of the X-coordinate of the intended draft effective region.

Updating of the counter table 30C is performed in the following manner. Namely if the contour point is the point to be drafted in the start point memory 30A in the above-mentioned another drafting effective region, the value of the storage unit portion of the counter table 30C at the corresponding position is incremented by "1". On the other hand, if the contour point is the point to be drafted in the stop point memory 30B in the above-mentioned another drafting effective region, the value of the storage unit portion of the counter table 30C at the corresponding position is decremented by "1". The foregoing process is repeated until drafting of the contour points for the intended drafting effective region is completed (step 507).

Once drafting of the contour points for one of the drafting effective region is completed, the painting process by the paint processing portion 33 is performed for the corresponding drafting effective region, in the manner set out below. After completion of the painting process, the above-mentioned contour drafting process is performed. These processes are repeated for all drafting effective regions.

Figure 3A:
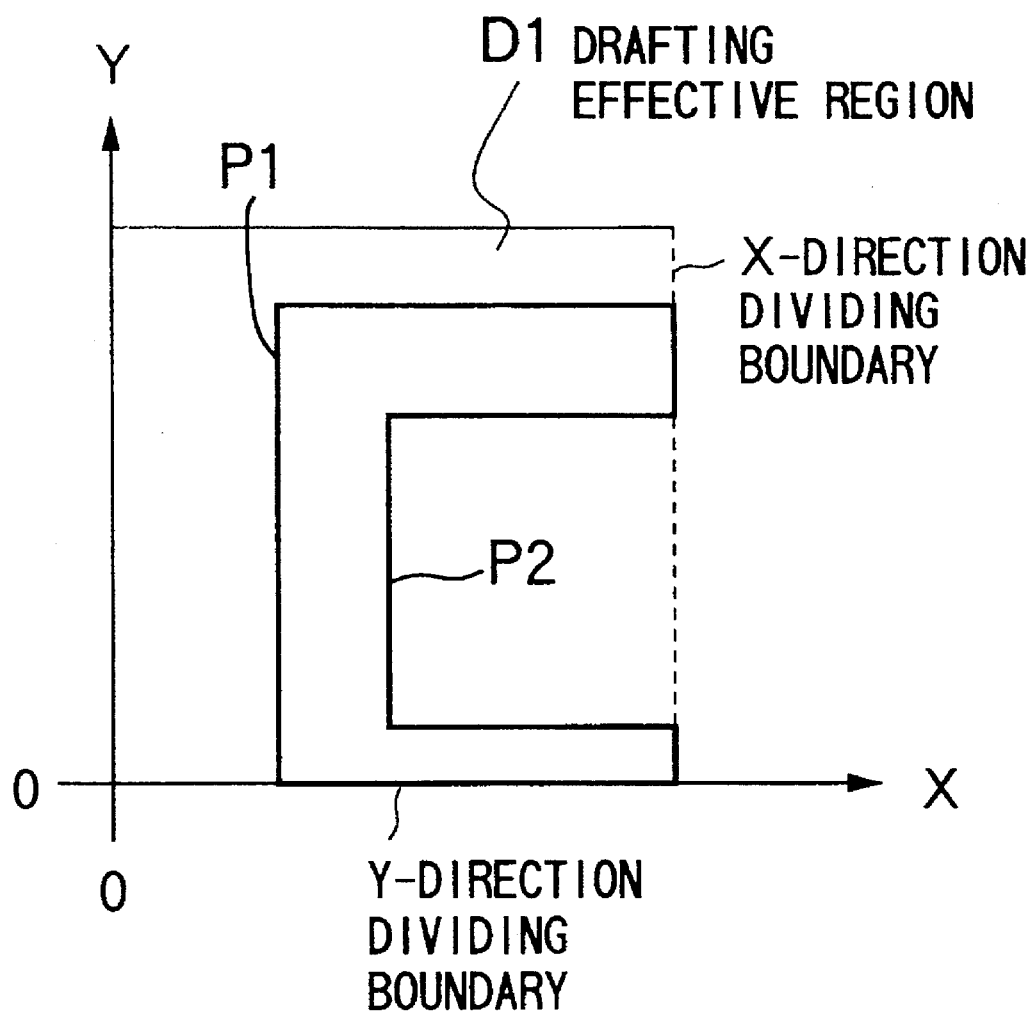
FIG. 3A is an illustration of a character portion corresponding to a draft effective region shown in FIG. 2.

FIG. 3A illustrates the drafting effective region D1 of FIG. 2; FIG. 3B shows contents of the start point memory 30A and the counter table 30C when the contour drafting process for the drafting effective region D1 for the character "E" is performed; and FIG. 3C shows the content of the stop point memory 30B.

In FIG. 3B, as a result of the contour drafting process by the above-mentioned contour drafting control portion 31 for the portion of the character "E" to be contained within the drafting effective region D1, the contour information "1" of the contour point corresponding to a contour P1 is written in the storage unit portion of the start point memory 30A at the corresponding position. On the other hand, other contour points are ignored so as not to write the contour information since the incremental values in the Y direction are "0".

On the other hand, the drafting effective region positioned at the raster scan starting side relative to the drafting effective region D1 is not present. Namely, the contour point having the Y-coordinate within the drafting effective region D1 and X-coordinate smaller than the minimum value of the X-coordinate of the drafting effective region D1 is not present. Therefore, the counter table 30C is not updated and all storage unit portions are maintained at "0".

Figure 4A:
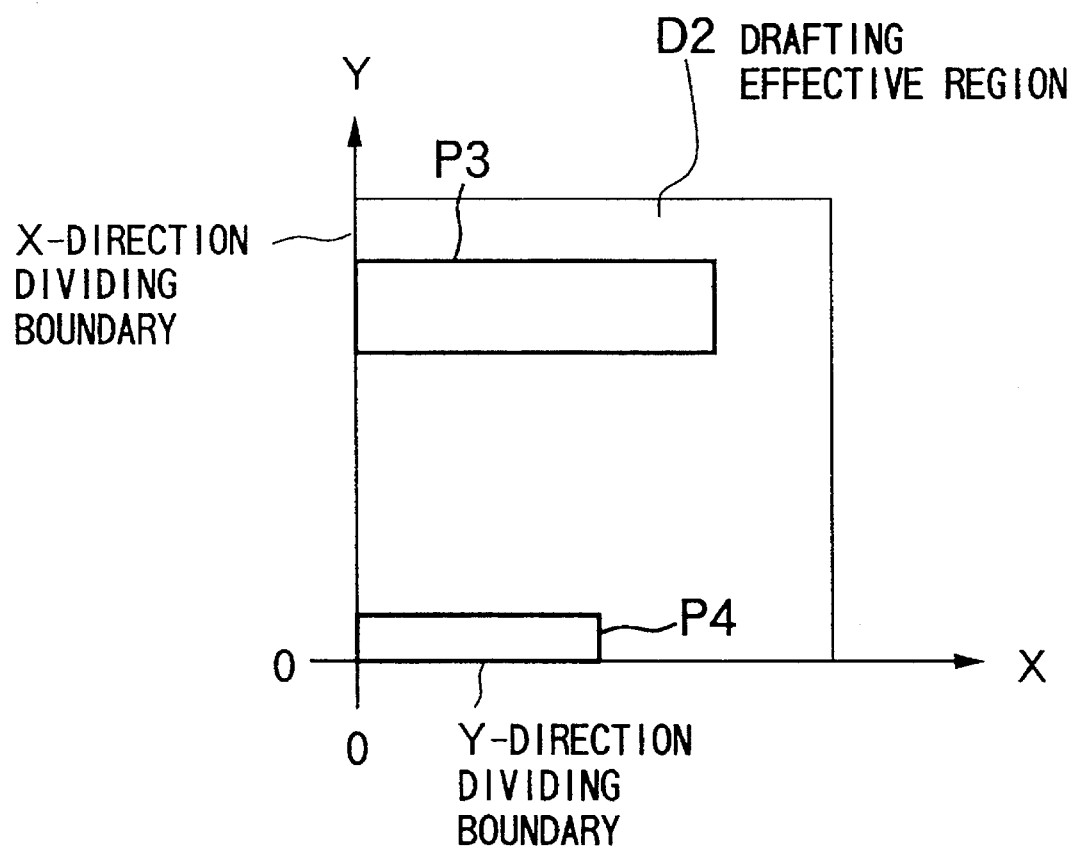
FIG. 4A is an illustration showing a character portion corresponding to another drafting effective area shown in FIG. 2.

FIG. 4A illustrates the drafting effective region D2 of FIG. 2; FIG. 4B shows contents of the start point memory 30A and the counter table 30C when the contour drafting process for the drafting effective region D2 for the character "E" is performed; and FIG. 4C shows the content of the stop point memory 30B.

In FIG. 4B, as a result of the contour drafting process by the above-mentioned contour drafting control portion 31 for the portion of the character "E" to be contained within the drafting effective region D1, since no contour point to be written in the start point memory 30A is present, the start point memory 30A is maintained in the cleared state. On the other hand, the contour information "1" of the contour points corresponding to contours P3 and P4 are written in the storage unit portions of the stop point memory 30B at the corresponding position. On the other hand, other contour points are ignored so as not to write the contour information since the incremental values in the Y direction are "0".

On the other hand, since the drafting effective region D1 positioned at the raster scan starting side relative to the drafting effective region D2 is present, updating of the counter table 30C is effected on the basis of the contour point present in the drafting effective region D1. Namely, for the contour point forming the contour P1 of the drafting effective region D1, the storage unit portion od the counter table 30C corresponding in the Y-axis direction is incremented by "1". Also, for the contour point forming the contour 2, the storage unit portion of the counter table 30C in the corresponding position, is decremented by "1". As a result, the content becomes as illustrated in FIG. 4B.

Once the contour drafting process for the specific drafting effective region is completed in the contour drafting control portion 31, a completion signal is fed to the transferring portion 33 for notice. On the other hand, in conjunction therewith, offset values in X and Y directions of the intended drafting effective region is noticed to the paint processing portion 32.

Figure 6:
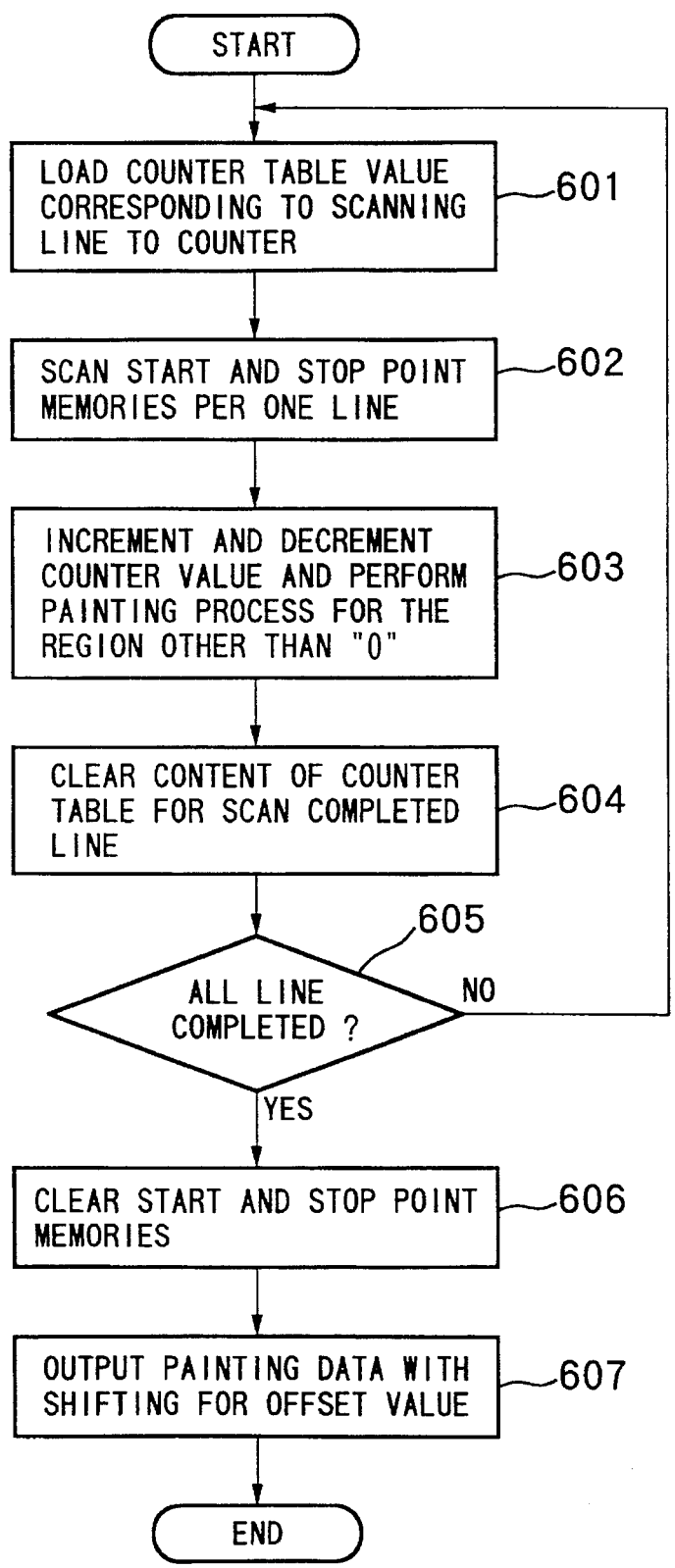
FIG. 6 is a flowchart for discussion of a process of a paint processing portion.

Hereinafter, discussion will be given for the content of process of the paint processing portion with reference to the flowchart of FIG. 6. When the completion signal is fed from the contour drafting control portion 31 to the transferring portion 33, an initiation signal is fed from the transferring portion 33 to the paint processing portion 32. Then, the paint processing portion 32 initiates painting process. The paint processing portion 32 generates a painting data by raster scanning the start point memory 30A and the stop point memory 30B per one line in the X direction from the uppermost line.

In advance of initiating raster scan, notice is send to the count table control portion 34 to read out the content (painting control information) of the storage unit portion of the counter table 30C corresponding to the line to be raster scanned. The read out value is loaded to the counter 32A (step 601).

Thereafter, raster scanning is performed for the start point memory 30A and the stop point memory 30B per one line in the X direction (step 602). Whenever the contour information "1" is detected in the start point memory 30A during scanning one line, the value of the counter 32A is incremented by "1". On the other hand, whenever the contour information "1" is detected in the stop point memory 30B during scanning one line, the value of the counter 32A is decremented by "1". Furthermore, during scanning, the value of the counter 32A is checked with respect to each pixel (dot) in the X direction to paint the pixel (dot) in the contour drafting region, in which the value of the counter 32A is other than "0". Conversely, for the contour drafting region where the value of the counter 32A is "0", painting is not performed. Thus, the painting data is generated (step 603). With this painting data, the portions to be painted are displayed in light display and other portions are displayed in dark display, in case that the output device 115 is a display unit. Also, the content of the counter table 30C corresponding to the lines, for which raster scan is completed, is cleared (step 604). The foregoing process is repeated for all lines of the start point memory 30A and the stop point memory 30B.

Once painting process is completed for the start point memory 30A and the stop point memory 30B with respect to the intended contour drafting region, the content of the start point memory 30A and the stop point memory 30B for the intended contour drafting region is cleared (all reset to "0") (step 606).

The generated painting data is output to the transferring portion 33 in a shifted condition in the extent corresponding to the offset value of the intended drafting effective region (step 607).

The operation of the above-mentioned paint processing portion 32 will be discussed with reference to FIG. 7. It is assumed that the value of the counter table 30C corresponding to the line to be scanned is +2 upon raster scanning the start point memory 30A and the stop point memory 30B. On the other hand, the content of the lines of the start point memory 30A and the stop point memory 30B to be scanned are so shown. Before initiation of raster scanning for the relevant line, the value +2 of the counter table 30C is loaded to the counter 32A. As shown in FIG. 7, at the portion of the start point memory 30A where the contour information is "1", the value of the counter 32 is incremented. 0n the other hand. at the portion of the stop point memory 30B where the contour information is "1", the value of the counter 32 is decremented. Then, during scanning, the painting data written "1" as the painting information for the pixel portions other than those where the value of the counter 32A is held "0". It should be appreciated that when painting process is to be performed for the pixel portions, the portion where the value of the counter 32A varies from "1" to "0", the painting process is performed as the portion where the contour information "1" is present.

In FIG. 8, there is illustrated an example where the painting data for a part of the character (a part of the character "E" in the drafting effective region D1 through the painting process on the basis of the content of the start point memory 30A and the counter table 30C of FIG. 3B and the content of the stop point memory of FIG. 3C. On the other hand, in FIG. 9, there is illustrated an example where the painting data for a part of the character (a part of the character "E" in the drafting effective region D2 through the painting process on the basis of the content of the start point memory 30A and the counter table 30C of FIG. 4B and the content of the stop point memory of FIG. 4C. In the examples of FIGS. 8 and 9, for convenience, the discussion is given with setting the X direction physical size and the Y direction physical size of the start point memory 30A and the stop point memory 30B at extraordinarily small size. As can be appreciated from FIGS. 8 and 9, through the process set forth above, the painting data accurately expresses the portions of the character "E" within the drafting effective regions D1 and D2 as the divided regions of the character.

The transferring portion 33 is responsive to reception of the painting data to output the painting data to the supervisory system 100. Namely, in the example of FIG. 2, the painting data is transferred to the supervisory system 100 per each drafting effective region D1–D4.

Once outputting of the painting data to the supervisory system 100 is completed, the completion signal is fed to the contour drafting control portion 31. The contour drafting control portion 31 is responsive to the completion signal to perform contour drafting process for the next drafting effective region.

By repeating the foregoing process, the painting data for all of the drafting effective regions is output to the supervisory system 100. Then, by coupling the painting data for a plurality of drafting effective regions, into which the character is divided, the character pattern of the character can be displayed or printed.

It should be appreciated that although the foregoing discussion has been given for the case where the raster scanning is performed from left to right, it is possible to perform scan in the direction from right to left. In such case, the contour drafting control portion 31 sends a notice to the counter table control portion 34 when the contour point is present in another drafting effective region positioned at the raster scanning starting side (right side) during painting process to update the storage of the storage unit portion of the counter table 30C at the corresponding position. Namely, the counter table 30C is updated only for the contour point which has the Y-coordinate within the intended drafting effective region and the X-coordinate greater than the maximum X-coordinate of the intended drafting effective region.

As set forth above, with the image signal generating system according to the present invention, since painting process can be performed with the drafting effective region of the work memory 30 having the physical size substantially corresponding to the physical sizes of the start point memory 30A and the stop point memory 30B by dividing the character into a plurality of segment in X and Y directions, the painting data for obtaining the arbitrary size of the character pattern can be generated with a small capacity of work memory without relying on the size of the work memory.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An image signal generating system comprising:

a work memory having storage portions arranged in an array of m in number in an X-direction and n in number in a Y-direction, for storing contour information of a predetermined character per pixel for generating a painting data;

a counter table having n in number of storage portions corresponding to the Y direction of said work memory;

contour drafting control means for inputting a stroke information indicative of a closed contour of said predetermined character and a drafting effective region indicative of each divided region when said predetermined character is divided into a plurality of regions, generating contour points of said predetermined character on the basis of said character information, writing contour information of the generated contour points in the corresponding storage portions of said work memory per said drafting effective region, and, whenever a contour point to be present in another drafting effective region positioned at a raster scanning starting side in the X-direction with respect to said drafting effective region currently processed, is present, updating a value stored in the storage portion of said counter table at a corresponding position in the Y-direction to said contour point; and painting means for scanning said work memory per one line in the X-direction, updating a value of said storage portion of said counter table corresponding to the scanning line and generating said painting data for the area where the value of the counter table is other than "0".

2. An image signal generating system as set forth in claim 1, wherein said work memory includes a start point memory for writing contour points starting the painting process and a stop point memory for writing contour points terminating the painting process;

said contour drafting means increments by "1" the value stored in said storage portion of said counter table corresponding in the Y-direction when said contour point presents in another drafting effective region positioned at the raster scanning starting side in the X-direction is the contour point to be written in said starting point memory and decrements by "1" the value stored in said storage portion of said counter table corresponding in the Y-direction when said contour point presents in another drafting effective region positioned at the raster scanning starting side in the X-direction is the contour point to be written in said stop point memory; and said painting means scans said start point memory and said stop point memory per one line in the X-direction, increments the value stored in said storage portion of said counter table by "1" whenever said contour information is present in said start point memory, decrements the value stored in said storage portion of said counter table by "1" whenever said contour information is present in said stop point memory, and generates said painting data for the region where the value of said counter table is other than "0".

3. An image signal generating system as set forth in claim 1, wherein said painting means loads the values of said storage portion of said counter table corresponding to the line to be scanned whenever raster scanning for one line of said work memory is completed, and a counter for performing counting process for the loaded value.

4. An image signal generating system as set forth in claim 1, wherein said counter table is assigned to a part of said work memory.

5. An image signal generating system as set forth in claim 3, which further comprises counter table control means for updating said counter table in response to a command from said contour drafting control means and loading the values in said storage portion of said counter table corresponding to the line to be scanned.

6. An image signal generating system as set forth in claim 2, wherein said counter table is assigned to a part of one of said start point memory and said stop point memory.

7. An image signal generating system comprising:

a start point memory and a stop point memory each having storage portions arranged in an array of m in number in an X-direction and n in number in a Y-direction, for storing contour information of a predetermined character per pixel for generating a painting data;

a counter table having n in number of storage portions corresponding to the Y direction of said memories;

contour drafting control means for inputting a stroke information indicative of a closed contour of said predetermined character and a drafting effective region indicative of each divided region when said predetermined character is divided into a plurality of regions, generating contour points of said predetermined character on the basis of said character information, writing contour information of the contour points for starting a painting process in the corresponding storage portions of said start point memory and of the contour points for terminating a painting process in the corresponding storage portions of said stop point memory per said drafting effective region, and, whenever a contour point to be present in another drafting effective region positioned at a raster scanning starting side in the X-direction with respect to said drafting effective region currently processed, is present, updating a value stored in the storage portion of said counter table at a corresponding position in the Y-direction to said contour point; and painting means for scanning said memories per one line in the X-direction, updating a value of said storage portion of said counter table corresponding to the scanning line and generating said painting data for the area where the value of the counter table is other than "0".

8. An image signal generating system as set forth in claim 7, wherein said painting means loads the values of said storage portion of said counter table corresponding to the line to be scanned whenever raster scanning for one line of said start point memory and said stop point memory is completed, and a counter for performing counting process for the loaded value.

9. An image signal generating system as set forth in claim 8, which further comprises counter table control means for updating said counter table in response to a command from said contour drafting control means and loading the values in said storage portion of said counter table corresponding to the line to be scanned.

* * * * *